United States Patent [19]

Quinn et al.

[11] 4,358,569
[45] Nov. 9, 1982

[54] BLENDS OF COPOLYESTER-CARBONATE WITH POLYSULFONE

[75] Inventors: Clayton B. Quinn, Mt. Vernon; Niles R. Rosenquist, Evansville, both of Ind.

[73] Assignee: General Electric Company, Mt. Vernon, Ind.

[21] Appl. No.: 221,704

[22] Filed: Dec. 31, 1980

[51] Int. Cl.³ .................. C08L 67/02; C08L 81/06
[52] U.S. Cl. .............................. 525/439; 525/534
[58] Field of Search .................... 525/462, 439, 534

[56] References Cited

U.S. PATENT DOCUMENTS

| | | | |
|---|---|---|---|
| 3,365,517 | 1/1968 | Barth | 525/462 |
| 3,775,367 | 11/1973 | Krefeld | 260/45.9 R |
| 3,836,490 | 9/1974 | Bockmann et al. | 260/18 TN |
| 3,845,007 | 10/1974 | Krefeld et al. | 260/37 PC |
| 4,092,291 | 5/1978 | Mark | 525/462 |
| 4,152,367 | 5/1979 | Binsack et al. | 525/462 |
| 4,197,232 | 4/1980 | Bialous et al. | 260/37 PC |
| 4,219,635 | 8/1980 | Cooke et al. | 525/462 |
| 4,238,596 | 12/1980 | Quinn | 525/439 |

*Primary Examiner*—Wilbert J. Briggs, Sr.
*Attorney, Agent, or Firm*—Martin B. Barancik; William F. Mufatti

[57] ABSTRACT

A thermoplastic molding composition having improved impact strength and flame retardency comprising an intimate blend of a polysulfone and a copolyester-carbonate.

12 Claims, No Drawings

BLENDS OF COPOLYESTER-CARBONATE WITH POLYSULFONE

This invention relates to novel thermoplastic resin compositions and more particularly to polymer compositions comprising a polysulfone and a copolyestercarbonate.

BACKGROUND OF THE INVENTION

Two of the most desirable characteristics to be found in polymer materials are impact strength and flame retardancy. With respect to the development of flame-retardent or flame-resistant polymer materials a significant amount of time and effort has been devoted to the development of various additives which, when incorporated into the polymer compositions, render such compositions flame-resistant. Similar research has also been undertaken with regards to the development of various additives employed to increase the impact strength of polymer compositions.

SUMMARY OF THE INVENTION

One object of the present invention is to provide a novel thermoplastic resin composition.

Another object of the present invention is to provide a copolyester-carbonate polysulfone blend composition which posses a high impact strength and high flame retardancy.

The instant invention relates to an improved thermoplastic resin composition which comprises a blend of a random thermoplastic copolyester carbonate and a high molecular weight polysulfone containing sulfone groups and aromatic nuclei in the main polymer chain.

DETAILED DESCRIPTION OF THE INVENTION

It has now been surprisingly discovered that the admixture of two distinct polymer compositions results in a polymer blend possessing an impact strength and flame-retardency which is superior to such properties in either single polymer composition. The two distinct polymer compositions, which when blended together yield such results, are a polysulfone and a polyester-carbonate copolymer. The weight ratio of polysulfone to polyester-carbonate copolymer can range from 3:2 to 2:3 with the most preferred weight ratio being about 1:1.

The polysulfones employed in the practice of the present invention are high molecular weight polymers containing sulfone groups and aromatic nuclei in the main polymer chain. Polysulfone is a rigid, strong thermoplastic that can be molded, extruded, and thermoformed (in sheets) into a variety of shapes. It is highly resistant to chemicals, heat, oxidation and hydrolysis, and retains electrical properties over a wide temperature range, up to 350° F. The polysulfone repeating units can be characterized by the general formula:

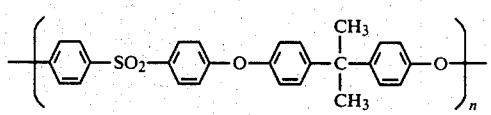

wherein n has a value from about 50 to about 80.

Polysulfone can be prepared in situ by reacting 2,2-bis(4-hydroxyphenyl) propane (commonly referred to as bisphenol-A) with exactly two moles of aqueous sodium hydroxide and one mole of 4,4′-dichlorodiphenylsulfone. A dipolar aprotic solvent is required for this polymerization and dimethyl sulfoxide is preferred. The reaction must be carried out at 130° C. to 160° C. primarily because of the poor solubility of the disodium salt at lower temperatures. Chain growth is regulated by the addition of terminators. Termination can be effected either by addition to the original charge of up to 2 mole percent of a monohydric phenol salt such as sodium phenate or by the addition of a monohalogen compound such as methylchloride when the desired molecular weight is reached.

Other bisphenol-A-derived polysulfones are prepared by using various combinations of dihydric phenol sodium or potassium salts and dichlorodiphenyl sulfone or other aromatic dihalides. The diphenol sodium or potassium salts in combination with the dichlorodiphenyl sulfone or other aromatic dihalides that can be employed in preparing a high polymer in anhydrous dimethyl sulfoxide or tetramethylene sulfone (sulfolane) include the following: 4,4′-dihydroxydiphenyl sulfide, 4,4′-dihydroxydiphenyl oxide 4,4′-dihydroxydiphenylmethane, bis(4-hydroxyphenyl)-2,2-perfluoropropane, bis(4-hydroxyphenyl)-1,1-cyclohexane, 4,4′-dihydroxybenzophenone, hydroxyquinone, 4,4′-dihydroxydiphenylmethane, 4,4′-dihydroxydiphenyl, and 4,4′-dihydroxydiphenyl sulfone. Examples of various dihalides that can result in the formation of a high polymer with bisphenol-A salts in anhydrous dimethyl sulfoxide include the following: 2,4-dichloronitrobenzene, 4,4′-difluorobenzophenone, 4,4′-difluorodiphenyl sulfoxide, and 4,4′-difluorozobenzene.

The polysulfones that can be employed in the practice of the present invention are commercially available products. The Union Carbide Corporation manufactures and sells polysulfone under the trademark UDEL.

The polyester-carbonates can generally be termed copolyesters containing carbonate groups, carboxylate groups and aromatic carbocyclic groups in the polymer chain, in which at least some of the carboxylate groups and at least some of the carbonate groups are bonded directly to ring carbon atoms of the aromatic carbocyclic groups. These polyester-carbonates are in general prepared by reacting bifunctional carboxylic acid or a reactive derivative of the acid such as the acid dihalide, a dihydric phenol, a carbonate precursor and a monofunctional molecular weight regulator or chainstopper.

The dihydric phenols that can be employed in the practice of this invention are bisphenols such as bis(4-hydroxyphenyl) methane, 2,2-bis(4-hydroxyphenyl) propane (bisphenol-A), 2,2-bis(4-hydroxy-3-methylphenyl) propane, 4,4-bis(4-hydroxyphenyl) heptane, 2,2-bis(4-hydroxy-3,5- dichlorophenyl) propane, 2,2-bis(4-hydroxy-3,5-dibromophenyl) propane, etc.; dihydric phenol ethers such as bis(4-hydroxyphenyl) ether, bis(3,5-dichloro-4-hydroxyphenyl) ether, etc.; dihydroxydiphenyls such as p,p′-dihydroxydiphenyl, 3,3′-dichloro-4,4-dihydroxydiphenyl, etc.; dihydroxyaryl sulfones such as bis(4-hydroxyphenyl) sulfone, bis(3,5-dimethyl-4-hydroxyphenyl) sulfone, etc.; dihydroxy benzenes, resorcinol, hydroquinone, halo- and alkyl-substituted dihydroxy benzenes such as 1,4-dihydroxy-2,5-dichlorobenzene, 1,4-dihydroxy-3-methylbenzene, etc.; and dihydroxy diphenyl sulfoxides such as bis(4-hydroxyphenyl) sulfoxide, bis(3,5-dibromo-4-hydroxyphenyl) sulfoxide, etc. A variety of additional dihydric phenols are also available such as are disclosed in U.S.

Pat. Nos. 2,999,835; 3,028,365 and 3,153,008. Also suitable are copolymers prepared from the above dihydric phenols copolymerized with halogen-containing dihydric phenols such as 2,2-bis(3,5-dichloro-4-hydroxyphenyl) propane, 2,2-bis(3,5-dibromo-4-hydroxyphenyl)-propane, etc. It is also possible to employ two or more different dihydric phenols or a copolymer of a dihydric phenol with a glycol or with hydroxy or acid terminated polyester, or with a dibasic acid as well as blends of any of the above materials.

The acid dichlorides that can be employed are both the aromatic and the saturated aliphatic dibasic acids. The saturated, aliphatic dibasic acids which are derived from straight chain paraffin hydrocarbons, such as oxalic, malonic, dimethyl malonic, succinic, glutaric, adipic, pimelic, suberic, azelaic and sebacic acid and the halogen-substituted aliphatic dibasic acids. Aliphatic carboxylic acids containing hetero atoms in their aliphatic chain, such as thio-diglycollic or diglycollic acid can also be used as well as unsaturated acids such as maleic or fumaric.

Suitable examples of aromatic and aliphatic aromatic dicarboxylic acids which can be used are phthalic, isophthalic, terephthalic, homophthalic, o-, m-, and p-phenylenediacetic acid; the polynuclear aromatic acids such as diphenic acid, and 1,4-naphthalic acid. Preferred acid dichlorides are isophthaloyl dichloride (IPCl$_2$), and terephthaloyl dichloride (TPCl$_2$) as well as mixtures thereof. When mixtures of IPCl$_2$ and TPCL$_2$ are employed, they are preferably present at a IPCl$_2$:TPCl$_2$ weight ratio in the range of about 5-95:-95-5.

The random copolyester-carbonates of the invention can be prepared by well known processes such as by interfacial polymerization or phase boundry separation, transesterification, and the like. These processes typically include dissolving the reactants in a suitable solvent medium under controlled pH conditions and in the presence of a suitable catalyst and acid acceptor and then contacting these reactants with a carbonate precursor. A molecular weight regulator; i.e., chainstopper, is generally added to the reactants prior to contacting them with a carbonate precursor.

The acid acceptor employed can be either an organic or an inorganic acid acceptor. A suitable organic acid acceptor is a tertiary amine and includes such materials as triethylamine, dimethylaniline, tributylamine, etc. The inorganic acid acceptor can be one which can be either a hydroxide, a carbonate, a bicarbonate, or a phosphate of an alkali or alkaline earth metal.

The carbonate precursor employed can be either a carbonyl halide, a carbonate ester or a haloformate. The carbonyl halides which can be employed are carbonyl bromide, carbonyl chloride and mixtures thereof. Typical of the carbonate esters that can be employed are diphenyl carbonate, di-(halophenyl) carbonates such as di-(chlorophenyl) carbonate, di-(bromophenyl) carbonate, di-(trichlorophenyl) carbonate, di-(tribromophenyl) carbonate, etc., di-(alkylphenyl) carbonate such as di-(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bishaloformates of dihydric phenols (bis-chloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid such as are disclosed in U.S. Pat. No. 3,169,121 which is incorporated herein by reference.

The catalysts which can be employed can be any of the suitable catalysts that aid the polymerization of the bisphenol-A with the acid dichloride and with phosgene. Suitable catalysts include tertiary amines such as triethylamine, tripropylamine, N,N-dimethylaniline, quaternary ammonium compounds such as tetraethylammonium bromide, cetyl triethylammonium bromide, tetra-n-heptylammonium iodide, tetra-n-propylammonium bromide, tetramethylammonium chloride, and quaternary phosphonium compounds such as n-butyltriphenyl phosphonium bromide and methyltriphenyl phosphonium bromide.

The solvent system employed is one in which the reactants can be accepted but which is inert with respect to the reactants. For example, an aqueous organic solvent system can be employed wherein the organic member can readily accept the reactants, but be inert to them. Exemplary of such organic members are methylene chloride, chlorobenzene, cyclohexanone, carbon tetrachloride, and the like. Preferably, the organic portion of the solvent system is methylene chloride.

Also included herein are branched copolyester-carbonates wherein a polyfunctional aromatic compound is reacted with the dihydric phenol, the carbonate precursor and the acid dichloride to provide a thermoplastic randomly branched copolyester-carbonate. These polyfunctional aromatic compounds contain at least three functional groups which are carboxyl, carboxylic anhydride, haloformyl or mixtures thereof. Examples of these polyfunctional aromatic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. Preferred polyfunctional aromatic compounds are trimellitic anhydride or trimellitic acid, or their haloformyl derivatives.

Also included herein are blends of a linear and a branched copolyester-carbonate.

The molecular weight regulators or chainstoppers that can be employed in the practice of this invention include monohydric phenols, primary and secondary amines, etc. Preferred examples of these are represented by the following formulae:

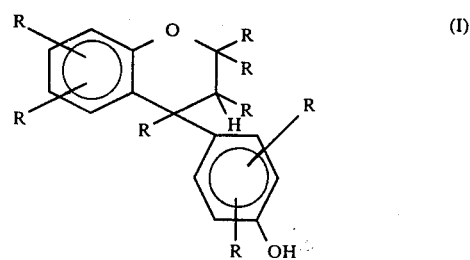

wherein R is H or alkyl radicals.

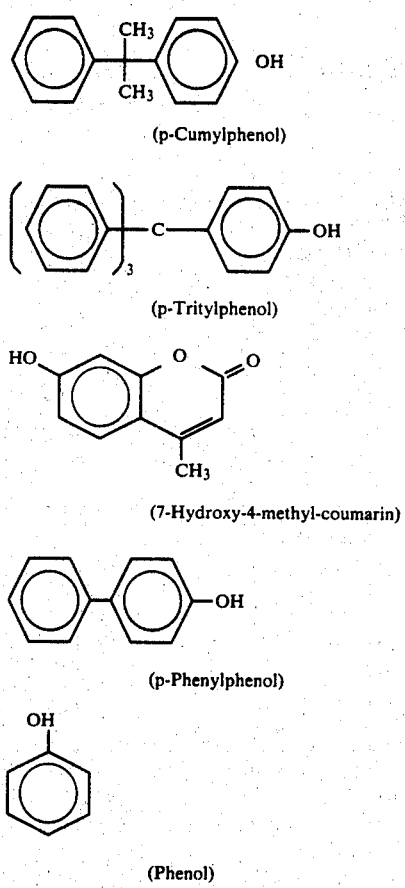

(p-Cumylphenol) (II)

(p-Tritylphenol) (III)

(7-Hydroxy-4-methyl-coumarin) (IV)

(p-Phenylphenol) (V)

(Phenol) (VI)

Of the foregoing chainstoppers, chroman-I of the chromanyl group and p-tertbutyl phenol are most preferred and they have the following structures:

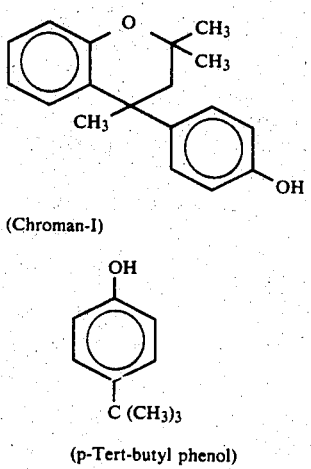

(Chroman-I) (VII)

(p-Tert-butyl phenol) (VIIII)

Preferably, the random copolyester-carbonates of the invention are obtained by the pH profile process disclosed in copending application Ser. No. 33,389, Apr. 26, 1979, assigned to the same assignee as this case and incorporated herein by reference. Pursuant to that process, a dihydric phenol, an acid dichloride and a phenol are reacted in a suitable solvent system at a pH level of about 8–11; then a carbonate precursor is added and the pH adjusted to a level of about 9–12; and, the addition of the carbonate precursor is contained until the reaction is completed.

Regardless of which process is employed, it is important that the solvent system employed be free of pyridine as it has been found that pyridine cannot be removed from the end product. The presence of pyridine in the copolyester-carbonate results in a product wherein such properties as color, thermal aging, melt stability, and the like, are not satisfactory.

Other well known materials can also be employed for their intended function and include such materials as anti-static agents, mold release agents, thermal stabilizers, ultraviolet light stabilizers, reinforcing fillers such as glass and other inert fillers, foaming agents, and the like.

The polysulfone-copolyester-carbonate blends of the present invention are prepared by blending the particular polysulfone with the particular copolyester-carbonate employing conventional methods.

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE

A copolyester-carbonate polymer was prepared by reacting 2,2-bis(4-hydroxyphenol) propane (referred to as bisphenol-A), 36 mole percent phosgene and 64 mole percent of an 85/15 blend of terephthalyldichloride and isophthalyl dichloride in an organic medium with triethylamine, sodium gluconate and phenol, using aqueous sodium hydroxide as an acid acceptor.

The resulting copolyester-carbonate resin was then blended by conventional procedures with various amounts, as set forth in Table 1, of a polysulfone manufactured and sold by the Union Carbide Corporation under the trademark UDEL P-1700. The resulting polymer blend was then extruded at about 315° C.

The extrudate was comminuted into pellets and the pellets were then injection molded at about 315° C. into test bars of about 2½ in. by ½ in. by about ⅛ in. thick.

Impact strength was measured according to Notched Izod test on the ⅛ in. thick molded samples according to ASTM D256.

The test bars (5 for each sample listed in the table) were subject to the test procedure set forth in Underwriters' Laboratories, Inc. Bulletin UL-94, Burning Test for Classifying Materials. In accordance with this test procedure, materials so investigated are rated either V-O, V-I or V-II based on the results of 5 specimens. The criteria for each V (for vertical) rating per UL-94 is briefly as follows:

"V-O": Average flaming and/or glowing after removal of the igniting flame shall not exceed 5 seconds and none of the specimens shall drip flaming particles which ignite absorbent cotton.

"V-I": Average flaming and/or glowing after removal of the igniting flame shall not exceed 25 seconds and the flowing does not travel vertically for more than ⅛ inch of the specimen after flaming ceases and glowing is incapable of lighting absorbent cotton.

"V-II": Average flaming and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94, but by the standards of the instant invention as "burns". Further, UL-94 requires that all test bars in each test group must meet the V type rating to achieve the particular classification. Otherwise, the 5 bars receive the rating of the worst single bar. For example, if one bar is classified as V-II and the other four (4) are classified as V-O, then the rating for all 5 bars is V-II.

TABLE

| WEIGHT PERCENT | | Impact Strength ft.lb/in. | | Flame Out | Flame Out |
|---|---|---|---|---|---|
| Poly-sulfone | Copoly-ester-Carbonate | Notched Izod ⅛ in. | UL-94 Rating ⅛ in. | Time Range (Sec) | Time Average (Sec) |
| 0 | 100 | 5.4 | Burning | 4.3 to 40.8 | 14.5 |
| 10 | 90 | 6.7 | Burning | 1.6 to 39.6 | 13.4 |
| 25 | 75 | 7.3 | V-I | 1.9 to 11.6 | 5.6 |
| 50 | 50 | 10.6 | V-0 | 1.3 to 3.2 | 2.4 |
| 75 | 25 | 2.0 | V-I | 1.3 to 11.0 | 4.9 |
| 90 | 10 | 1.3 | Burning | 1.8 to 39.6 | 9.7 |
| 100 | 0 | 1.3 | *Burning | 1.3 to 33.0 | 16.2 |

It can be seen from the table that the weight ratio of polysulfone to polyester carbonate copolymer optimizes for both flame-retardancy and impact strength at about 1:1.

Other modifications and variations of the present invention are possible in the light of the above teachings. It is, therefore, to be understood that changes may be made in the particular embodiments described above which are within the full intended scope of the invention as defined in the appended claims.

What is claimed is:

1. A thermoplastic composition comprising a blend of:
   (a) a random, thermoplastic copolyester carbonate; and
   (b) a polysulfone whose repeating unit represented by the general formula:

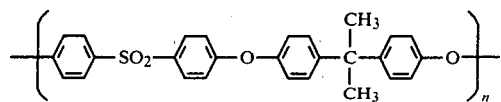

wherein n has a value of from about 50 to about 80.

2. The composition of claim 1, wherein the copolyester-carbonates are copolyesters containing carbonate groups, carboxylate groups, and aromatic carbocyclic groups in the polymer chain, in which at least some of the carboxylate groups and at least some of the carbonate groups are bonded directly to ring carbon atoms of the aromatic carbocyclic groups.

3. The composition of claim 1, wherein the polyester-carbonates are prepared by reacting a bifunctional carboxylic acid or a reactive derivative of the acid such as the acid dihalide, a dihydric phenol, a carbonate precursor and a monofunctional molecular weight regulator.

4. The composition of claim 3, wherein said dihydric phenol is bisphenol-A.

5. The composition of claim 3, wherein said diacid chloride is selected from the group consisting of $IPCl_2$, $TPCl_2$ and mixtures thereof.

6. The composition of claim 5, wherein said mixture has a isophthaloyl dichloride: terephthaloyl dichloride weight ratio in the range of about 5:95 to about 95:5.

7. The composition of claim 3, wherein said molecular weight regulator is selected from the group consisting of Chroman-I, phenol, p-cumylphenol, 7-hydroxy-4-methyl coumarin, p-phenyl phenol, p-tritylphenol, p-tert-butyl phenol, and mixtures thereof.

8. The composition of claim 3, wherein said molecular weight regulator chainstopper is t-butyl phenol, Chroman-I or phenol.

9. The composition of claim 1 or 2, wherein the weight ratio of polysulfone to copolyester-carbonate ranges from about 3:2 to about 2:3.

10. The composition of claim 1 or 2, wherein the weight ratio of polysulfone to copolyester-carbonate is about 1:1.

11. A composition in accordance with claims 1 or 3 wherein the weight ratio of polysulfone to copolyester-carbonate ranges from about 1:9 to about 3:1.

12. A composition in accordance with claims 1 or 3 wherein the weight ratio of polysulfone to copolyester-carbonate ranges from about 1:3 to about 3:1.

* * * * *